(12) United States Patent
Jung et al.

(10) Patent No.: US 11,702,226 B2
(45) Date of Patent: Jul. 18, 2023

(54) LIGHTING SYSTEM FOR AIR MOBILITY

(71) Applicants: Hyundai Motor Company, Seoul (KR); Kia Corporation, Seoul (KR)

(72) Inventors: Sang Hyun Jung, Hwaseong-si (KR); Kyu Hoon Cho, Suwon-si (KR); Chung Sik Yim, Anyang-si (KR); Jae Young Choi, Seongnam-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/379,828

(22) Filed: Jul. 19, 2021

(65) Prior Publication Data

US 2022/0185500 A1 Jun. 16, 2022

(30) Foreign Application Priority Data

Dec. 15, 2020 (KR) .................. 10-2020-0175423

(51) Int. Cl.
| | |
|---|---|
| *B64D 47/06* | (2006.01) |
| *F21S 43/19* | (2018.01) |
| *G09F 19/18* | (2006.01) |
| *F21W 107/30* | (2018.01) |

(52) U.S. Cl.
CPC .............. *B64D 47/06* (2013.01); *F21S 43/19* (2018.01); *G09F 19/18* (2013.01); *F21W 2107/30* (2018.01)

(58) Field of Classification Search
CPC ......... B64D 47/06; B64D 47/02; F21S 43/19; G09F 19/18; G09F 21/10; G09F 21/06; F21W 2107/30; B64C 29/0016
See application file for complete search history.

(56) References Cited

U.S. PATENT DOCUMENTS

| | | | | |
|---|---|---|---|---|
| 1,544,962 | A * | 7/1925 | Weinberg ............... | B64D 47/04 340/982 |
| 11,293,611 | B2 * | 4/2022 | Jha .......................... | F21S 41/40 |
| 2016/0280393 | A1 * | 9/2016 | Mouton ................. | B64D 47/04 |
| 2016/0362193 | A1 * | 12/2016 | Bemis ..................... | B64C 11/16 |
| 2021/0114747 | A1 * | 4/2021 | Hessling-Von Heimendahl ......... B60Q 1/525 |
| 2022/0185470 | A1 * | 6/2022 | Johns ................... | H05B 47/155 |

FOREIGN PATENT DOCUMENTS

| | | |
|---|---|---|
| EP | 3680180 A1 | 1/2019 |
| KR | 20-2020-0002392 U | 10/2020 |
| WO | WO-2022095051 A1 * | 5/2022 |

* cited by examiner

*Primary Examiner* — Brent Swarthout
*Assistant Examiner* — Mancil Littlejohn, Jr.
(74) *Attorney, Agent, or Firm* — Morgan, Lewis & Bockius LLP

(57) ABSTRACT

A lighting system for air mobility may include a light emitting unit provided on a boom or a propeller of the air mobility and configured to emit light toward a ground surface so that the light is projected onto a point directed toward the ground surface from the propeller or the boom; and a control unit electrically connected to the light emitting unit and configured to control light emitting modes of the light, emitted by the light emitting unit, based on operating modes of the air mobility or operating modes of the propeller.

14 Claims, 2 Drawing Sheets

LIGHTING SYSTEM FOR AIR MOBILITY

CROSS REFERENCE TO RELATED APPLICATION

The present application claims priority to Korean Patent Application No. 10-2020-0175423 filed on Dec. 15, 2020, the entire contents of which is incorporated herein for all purposes by this reference.

BACKGROUND OF THE INVENTION

Field of the Invention

The present invention relates to a lighting system for air mobility.

Description of Related Art

Recently, in urban areas, various types of transportation means are used which include personal transportation means, such as hoverboards and electric kickboards, and public transportation that utilizes electricity as a power source, and various types of power sources are used. This mobility is environmentally friendly in that the mobility eliminates traffic congestion in rush hour in a city and does not emit contaminants such as $NO_x$, $SO_x$, and CO because the mobility does not use an internal combustion engine.

Recently, with development of battery technologies, research and development are being actively conducted on the air mobility capable of operating even in the sky as well as on the ground. The air mobility may take off and land vertically using a high-output battery and thus does not require a separate runway such that the air mobility is suitable for application in crowded urban areas. As a result, the air mobility is expected to be commercially available in the near future.

The air mobility may be operated in an unmanned manner, which may cause a problem with safety. In particular, rotations of blades of propellers of the air mobility may cause personal injury and generate strong wind which may blow surrounding objects. Therefore, it is necessary to notify persons around the air mobility of the state of the air mobility to prevent the problem with safety.

The present invention relates to a lighting system which may be applied to the air mobility to give a warning to the persons around the air mobility.

The information included in this Background of the present invention section is only for enhancement of understanding of the general background of the present invention and may not be taken as an acknowledgement or any form of suggestion that this information forms the prior art already known to a person skilled in the art.

BRIEF SUMMARY

Various aspects of the present invention are directed to providing a lighting system for air mobility, which gives a caution or warning to occupants and persons around the air mobility.

According to one aspect, there is provided a lighting system for air mobility, the lighting system including: a light emitting unit provided on a boom or a propeller of the air mobility and configured to emit light toward a ground surface so that the light is projected onto a point directed toward the ground surface from the propeller or the boom; and a control unit electrically connected to the light emitting unit and configured to control light emitting modes for emitting the light from the light emitting unit, based on operating modes of the air mobility or operating modes of the propeller.

The light emitting unit may emit the light toward the ground surface when the air mobility is turned on.

A shape of the light projected onto the ground surface by the light emitting unit may be identical to a circular shape formed when the propeller rotates.

A shape of the light projected onto the ground surface by the light emitting unit may be a circular rim shape.

When power is applied to the propeller and the air mobility is in a flight standby state, the light emitted to the ground surface by the light emitting unit may form a rotation radius of the propeller or a warning message.

The operation of the light emitting unit may be stopped when the air mobility takes off.

The light emitted to the ground surface by the light emitting unit may form a brand logo of the air mobility.

The light emitted to the ground surface may form a rotation radius of the propeller or a warning message when the air mobility lands.

The light emitted by the light emitting unit may form a rotation radius of the propeller or a warning message when the air mobility has completed the landing and the propeller slowly stops rotating at a destination.

The light emitting unit may emit the light to form, on the ground surface, a guide shape that guides occupants to a boarding door of the air mobility when the air mobility is turned on before take-off or before the air mobility is turned off after landing.

The operating modes of the air mobility may include a standby mode, a take-off mode, and a landing mode, and the light emitting unit may change colors, brightness, shapes, or light emitting periods of the light emitted based on the operating modes of the air mobility such that the operating modes of the air mobility are distinguished from the outside of the air mobility.

The operating modes of the propeller may include a standby mode and a driving mode, and the light emitting unit may change colors, brightness, shapes, or light emitting periods of the light emitted based on the operating modes of the propeller such that the operating modes of the propeller are distinguished from the outside of the air mobility.

The propeller may be provided on an upper portion of the boom, and the light emitting unit may be provided on a lower portion of the boom and disposed at a point opposite to the propeller to emit the light toward the ground surface.

The propeller may be provided on a lower portion of the boom, and the light emitting unit may be provided at a lower end portion of the propeller to emit the light toward the ground surface.

The lighting system for air mobility according to various exemplary embodiments of the present invention may effectively give a caution to passengers, who get on or off the air mobility or persons around the air mobility, and as a result, it is possible to prevent a problem with safety. When the lighting system emits light to form a brand logo of a manufacturer of the air mobility, it is possible to provide an effect of improving brand values such as an effect of upgrading brand images and promoting brands.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
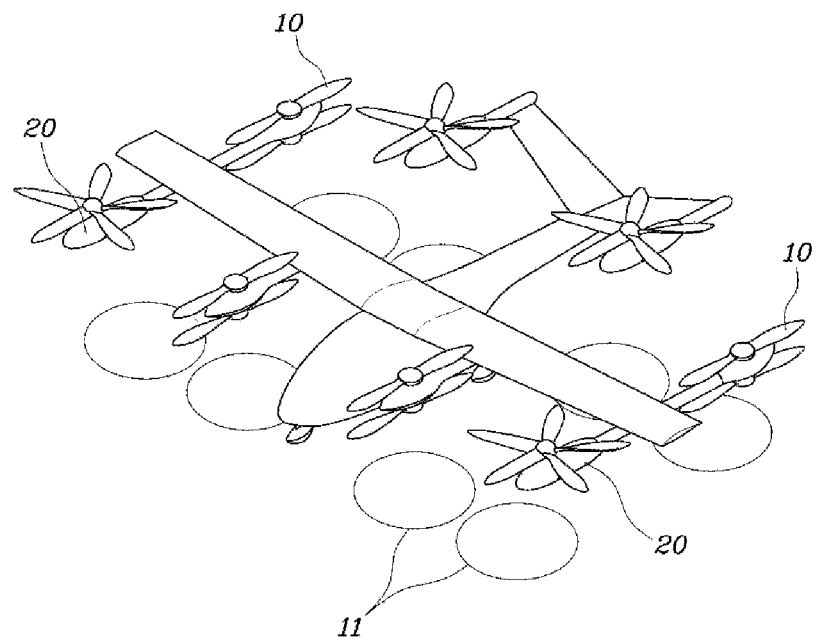
FIG. 1, FIG. 2, and FIG. 3 are views exemplarily illustrating air mobility to which a lighting system for air mobility according to various exemplary embodiments of the present invention is applied.

It may be understood that the appended drawings are not necessarily to scale, presenting a somewhat simplified representation of various features illustrative of the basic principles of the present invention. The specific design features of the present invention as included herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION OF THE PRESENT INVENTION

Reference will now be made in detail to various embodiments of the present invention(s), examples of which are illustrated in the accompanying drawings and described below. While the present invention(s) will be described in conjunction with exemplary embodiments of the present invention, it will be understood that the present description is not intended to limit the present invention(s) to those exemplary embodiments. On the other hand, the present invention(s) is/are intended to cover not only the exemplary embodiments of the present invention, but also various alternatives, modifications, equivalents and other embodiments, which may be included within the spirit and scope of the present invention as defined by the appended claims.

Hereinafter, a lighting system for air mobility according to various exemplary embodiments of the present invention will be described in detail.

Figure 2:
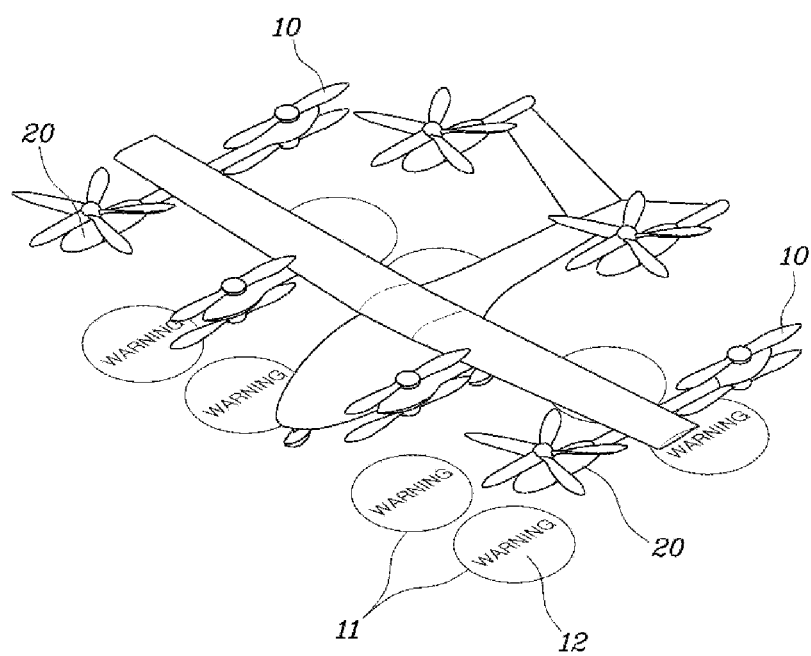
Figure 3:
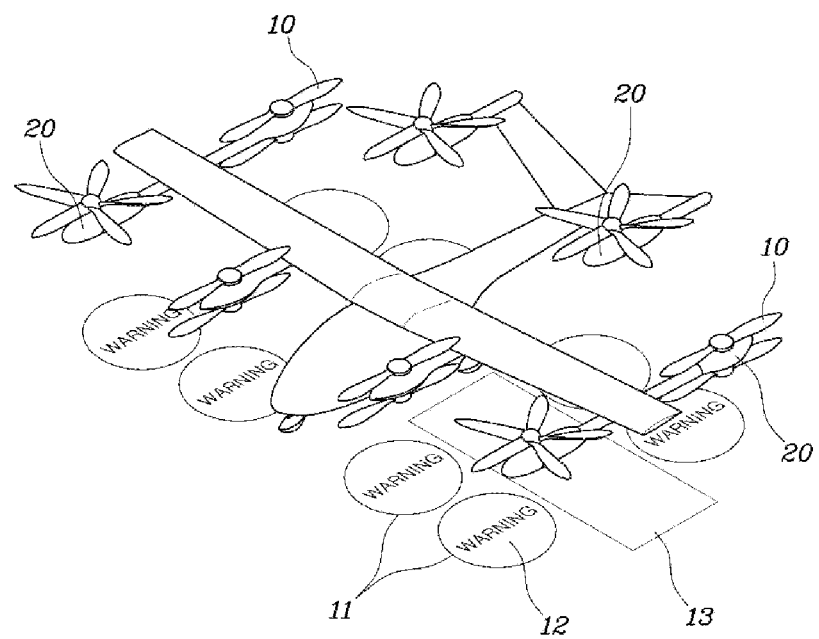
Figure 4:
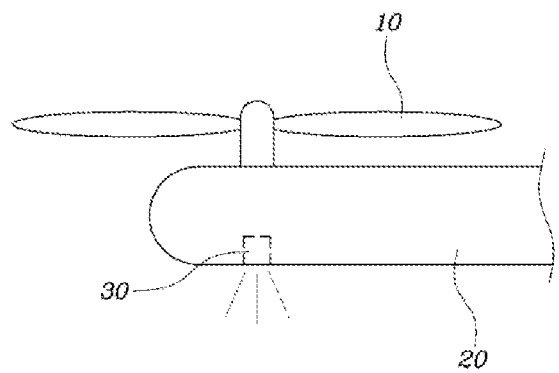
FIG. 4 and FIG. 5 are views exemplarily illustrating positions of light emitting units of the lighting system for air mobility according to the exemplary embodiment of the present invention.
Figure 5:
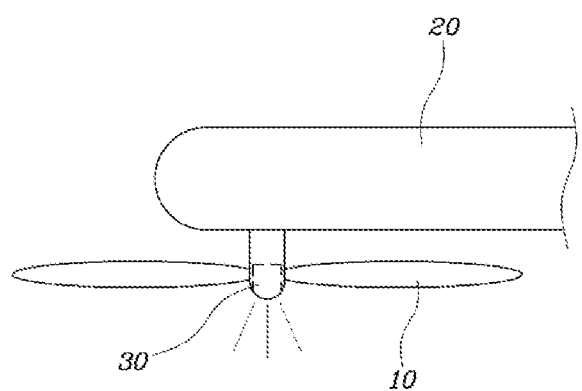

FIG. 1, FIG. 2, and FIG. 3 are views exemplarily illustrating air mobility to which the lighting system for air mobility according to various exemplary embodiments of the present invention is applied, and FIG. 4 and FIG. 5 are views exemplarily illustrating positions of light emitting units of the lighting system for air mobility according to the exemplary embodiment of the present invention.

To achieve the above-mentioned object, the lighting system for air mobility according to various exemplary embodiments of the present invention includes: a light emitting unit 30 provided on a boom 20 or a propeller 10 of the air mobility and configured to emit light toward the ground surface so that the light is projected onto a point directed toward the ground surface from the propeller or the boom; and a control unit electrically connected to the light emitting unit and configured to control light emitting modes for emitting the light from the light emitting unit 30 based on operating modes of the air mobility or operating modes of the propeller.

FIG. 1 is a view exemplarily illustrating the air mobility to which the lighting system for air mobility according to the exemplary embodiment of the present invention is applied. The specific embodiment will be described with reference to FIG. 1.

The air mobility takes off to the sky with rotations of the propellers 10. In the instant case, there is a risk that the propellers 10, which rotate at a high speed, may come into direct contact with and damage a human body, or due to the wind made by the propellers, which rotate at a high speed, an object such as gravel at a point at which the air mobility takes off or lands may damage a human body. Therefore, there is a great demand for preventing accidents by giving a caution or warning to persons around the air mobility immediately before and after the air mobility takes off or lands.

To the present end, the light emitting unit 30 provided on the boom 20 or the propeller 10 of the air mobility may intuitively warn of danger by emitting light toward the ground surface. For the persons around the air mobility to identify whether the air mobility is in a boarding standby state, whether the air mobility is configured to take off, or whether the air mobility is about to land intuitively recognize the state of the air mobility, the light emitting unit emits light suitable for each state to the ground surface. Furthermore, the light emitting unit may include a light emitting element configured for emitting light which may be recognized well even in the daytime.

The control unit is configured to control the light emitting unit so that the light emitting unit emits light suitable for an operating state of the air mobility or the propeller.

The use of the lighting system according to various exemplary embodiments of the present invention may prevent a deadly accident which may occur when the air mobility takes off or land.

The light emitting unit 30 may emit light toward the ground surface when the air mobility is turned on.

That is, even when passengers are getting in the air mobility in a state in which the air mobility is turned on but power is not applied to the propellers, the light emitting unit 30 emits light toward the ground surface to give a warning to occupants or persons around the air mobility.

A shape of the light projected onto the ground surface by the light emitting unit 30 may be identical to a circular shape formed when the propeller 10 rotates, and the shape of the light projected onto the ground surface by the light emitting unit may be a circular rim shape 11. Referring to FIG. 1, the light emitted by the light emitting unit may form various shapes on the ground surface. To give an intuitive warning to the occupants or the persons around the air mobility, the emitted light may form a circular shape which is identical to a circular shape made by end portions of the propeller during rotation. To give a warning more effectively, it is possible to more effectively give a warning as the light forms the circular rim shape 11 or a dynamic shape in which a rim thereof moves along a line or flickers.

When power is applied to the propellers and the air mobility is in a flight standby state, the light emitted to the ground surface by the light emitting unit may form a rotation radius of the propeller or a warning message. FIG. 2 is a view exemplarily illustrating the air mobility to which the lighting system for air mobility according to the exemplary embodiment of the present invention is applied, and FIG. 2 illustrates an exemplary embodiment of the shape of the light emitted when power is applied to the propellers and the air mobility is in the flight standby state. The specific embodiment will be described with reference to FIG. 2.

When the air mobility is in the flight standby state, such as when all the occupants completely get in the air mobility, the light emitting unit 30 may emit light to form, on the ground surface, a rotation radius of the propeller 10 or a warning message 12 such as 'WARNING' indicating that the persons around the air mobility may be in danger due to the propeller. The light emitted to the ground surface before the power is applied to the propeller may be different from the light emitted to the ground surface after the power is applied to the propeller, facilitating the persons around the air mobility to easily and intuitively recognize that the air mobility will take off soon.

When the air mobility takes off, the operation of the light emitting unit 30 may be stopped.

When the likelihood of the propeller causing physical damage to the persons around the air mobility decreases as the propellers 10 of the air mobility rotate and thus the air mobility takes off and rises to a predetermined height, the operation of the light emitting unit may be stopped to prevent confusion due to the light emitted by the light emitting unit.

Meanwhile, the light emitted to the ground surface by the light emitting unit may form a brand logo of the air mobility.

The light emitted by the light emitting unit may form a shape or a text for giving a caution or warning to the persons around the air mobility. However, when the rotation of the propeller is completely stopped or the air mobility lands and remains on standby over a long time period, the light emitting unit may emit light to form a trademark or brand logo of a manufacturer of the air mobility on the ground surface. Therefore, it is possible to express luxurious quality on the air mobility and implement a brand promotion effect.

When the air mobility arrives and lands at a destination, the light emitted to the ground surface may form the rotation radius of the propeller 10 or the warning message 12. When the air mobility slowly stops rotation of the propeller 10 after completely landing at the destination, the light emitted to the ground surface may form the rotation radius of the propeller or the warning message.

In an exemplary embodiment of the present invention, it is considered that the air mobility slowly stops rotation of the propeller 10, when the rotation of the propeller 10 is decreased lower than a predetermined rotation speed.

When the air mobility arrives and lands at the destination, the rotations of the propellers 10 or the wind generated by the rotations of the propellers 10 may injure the persons waiting for boarding or the persons around the air mobility. Therefore, when the air mobility is landing and when the air mobility cuts off the supply of power to the propeller 10 after completely landing, the light emitting unit 30 may form the rotation radius of the propeller 10 or the warning message 12 to give a warning.

Meanwhile, when the air mobility is turned on before take-off or when the air mobility is turned off after landing, the light emitting unit may emit light to form, on the ground surface, a guide shape 13 that guides occupants to a boarding door of the air mobility. FIG. 3 is a view exemplarily illustrating the air mobility to which the lighting system for air mobility according to the exemplary embodiment of the present invention is applied, and FIG. 3 illustrates an exemplary embodiment of the shape of the emitted light. The specific embodiment will be described with reference to FIG. 3.

The guide shape 13 may guide passengers to move to a disembarkation point outside the boarding door when the passengers get off the air mobility, and the guide shape 13 may guide passengers to board the air mobility. The guide shape 13 may be variously implemented as a rectangular shape such as a carpet shape. Therefore, the guide shape 13 may guide the passengers so that the passengers properly get in or off the air mobility, minimizing a problem with safety which may occur when the passengers get in or off the air mobility.

The operating modes of the air mobility include a standby mode, a take-off mode, and a landing mode. The light emitting unit may change colors, brightness, shapes, or light emitting periods of the light emitted based on the operating modes of the air mobility such that the operating modes of the air mobility may be distinguished from the outside of the air mobility.

The operating modes of the propeller include a standby mode and a driving mode. The light emitting unit may change colors, brightness, shapes, or light emitting periods of the light emitted based on the operating modes of the propeller such that the operating modes of the propeller may be distinguished from the outside of the air mobility.

The operating modes of the air mobility may be broadly classified into the standby mode, the take-off mode, and the landing mode, and it is possible to intuitively notify the occupants or the persons around the air mobility of states of the air mobility by changing colors, brightness, shapes, or light emitting periods of the light emitted based on the operating modes of the air mobility.

The operating modes of the propeller may be broadly classified into the standby mode and the driving mode, and it is possible to intuitively notify the occupants or the persons around the air mobility of states of the air mobility by changing colors, brightness, shapes, or light emitting periods of the light emitted based on the operating modes of the air mobility.

The differences in light, which is emitted by the light emitting unit, depending on the operating modes of the air mobility or the propeller may effectively give a caution to the occupants or the persons around the air mobility.

FIG. 4 and FIG. 5 are views exemplarily illustrating positions of the light emitting units of the lighting system for air mobility according to the exemplary embodiment of the present invention. The positions of the light emitting units will be described with reference to FIG. 4 and FIG. 5. The propeller may be provided on an upper portion of the boom 20, and the light emitting unit 30 may be provided on a lower portion of the boom and disposed at a point opposite to the propeller 10 to emit light toward the ground surface.

As illustrated in FIG. 4, the propeller 10 may be provided on the boom 20 and rotate. In the instant case, the light emitting unit needs to be positioned on the lower portion of the boom 20 to emit light to the ground surface.

Alternatively, as illustrated in FIG. 5, the propeller 10 may be provided on the lower portion of the boom 20, and the light emitting unit 30 may be provided at a lower end portion of the propeller 10 to emit light toward the ground surface.

According to design, the propeller 10 may be positioned on the lower portion of the boom 20, and in the instant case, the light emitting unit 30 may be positioned on a central axis of the propeller 10. In some instances, the light emitting unit 30 may be positioned and provided obliquely at a lower end portion of the boom 20 spaced from the propeller 10 to emit light toward the ground surface.

Furthermore, the term related to a control device such as "controller", "control unit", "control device" or "control module", etc refers to a hardware device including a memory and a processor configured to execute one or more steps interpreted as an algorithm structure. The memory stores algorithm steps, and the processor executes the algorithm steps to perform one or more processes of a method in accordance with various exemplary embodiments of the present invention. The control device according to exemplary embodiments of the present invention may be implemented through a nonvolatile memory configured to store algorithms for controlling operation of various components of a vehicle or data about software commands for executing the algorithms, and a processor configured to perform operation to be described above using the data stored in the memory. The memory and the processor may be individual chips. Alternatively, the memory and the processor may be integrated in a single chip. The processor may be implemented as one or more processors. The processor may include various logic circuits and operation circuits, may process data according to a program provided from the memory, and may generate a control signal according to the processing result.

The control device may be at least one microprocessor operated by a predetermined program which may include a series of commands for carrying out the method included in the aforementioned various exemplary embodiments of the present invention.

The aforementioned invention can also be embodied as computer readable codes on a computer readable recording medium. The computer readable recording medium is any data storage device that can store data which may be thereafter read by a computer system. Examples of the computer readable recording medium include hard disk drive (HDD), solid state disk (SSD), silicon disk drive (SDD), read-only memory (ROM), random-access memory (RAM), CD-ROMs, magnetic tapes, floppy discs, optical data storage devices, etc and implementation as carrier waves (e.g., transmission over the Internet).

In various exemplary embodiments of the present invention, each operation described above may be performed by a control device, and the control device may be configured by a plurality of control devices, or an integrated single control device.

In various exemplary embodiments of the present invention, the control device may be implemented in a form of hardware or software, or may be implemented in a combination of hardware and software.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A lighting system of an air mobility including a boom and a propeller provided on the boom, the lighting system comprising:
   the boom and the propeller;
   a light emitting unit provided on the boom or the propeller of the air mobility and configured to emit light toward a ground surface so that the light is projected onto a point directed toward the ground surface from the propeller or the boom; and
   a control unit electrically connected to the light emitting unit and configured to control light emitting modes for emitting the light from the light emitting unit according to operating modes of the propeller,
   wherein a shape of the light projected onto the ground surface by the light emitting unit is a circle formed when the propeller rotates,
   wherein the operating modes of the propeller include a standby mode and a driving mode, and the light emitting unit changes colors, brightness, shapes, or light emitting periods of the light emitted according to the operating modes of the propeller so that the operating modes of the propeller are distinguished from the outside of the air mobility.

2. The lighting system of claim 1, wherein the light emitting unit emits the light toward the ground surface when the air mobility is turned on.

3. The lighting system of claim 2, wherein the light projected onto the ground surface by the light emitting unit is in a shape of a circular rim.

4. The lighting system of claim 1, wherein when power is applied to the propeller and the air mobility is in a flight standby state, the light emitted to the ground surface by the light emitting unit is in a shape of a rotation radius of the propeller or provides a warning message.

5. The lighting system of claim 1, wherein operation of the light emitting unit is stopped when the air mobility takes off.

6. The lighting system of claim 1, wherein the light emitted to the ground surface by the light emitting unit forms a brand logo of the air mobility.

7. The lighting system of claim 1, wherein the light emitted to the ground surface forms a rotation radius of the propeller or a warning message when the air mobility lands.

8. The lighting system of claim 1, wherein the light emitted by the light emitting unit forms a rotation radius of the propeller or a warning message when the air mobility slowly stops rotation of the propeller after completely landing at a destination.

9. The lighting system of claim 8, wherein the light emitted by the light emitting unit forms the rotation radius of the propeller or the warning message when the air mobility decrease the rotation of the propeller lower than a predetermined rotation speed after completely landing at the destination.

10. The lighting system of claim 1, wherein the light emitting unit emits the light to form, on the ground surface, a guide shape that guides occupants to a boarding door of the air mobility when the air mobility is turned on before take-off or before the air mobility is turned off after landing.

11. The lighting system of claim 1, wherein the control unit is further configured to control the light emitting modes according to operating modes of the air mobility, and the operating modes of the air mobility include a standby mode, a take-off mode, and a landing mode, and the light emitting unit changes the colors, the brightness, the shapes, or the light emitting periods of the light emitted according to the operating modes of the air mobility so that the operating modes of the air mobility are distinguished from the outside of the air mobility.

12. The lighting system of claim 1, wherein the propeller is provided on an upper portion of the boom, and the light emitting unit is provided on a lower portion of the boom and disposed at a point opposite to the propeller to emit the light toward the ground surface.

13. The lighting system of claim 1, wherein the propeller is provided on a lower portion of the boom, and the light emitting unit is provided at a lower end portion of the propeller to emit the light toward the ground surface.

14. The lighting system of claim 13, wherein the light emitting unit is provided positioned on a central axis of the propeller.

\* \* \* \* \*